US006757078B1

(12) United States Patent
Bai et al.

(10) Patent No.: US 6,757,078 B1
(45) Date of Patent: Jun. 29, 2004

(54) PATTERN RENDERING SYSTEM AND METHOD

(75) Inventors: Yingjun Bai, Rochester, NY (US); Scott A Bennett, Canandaigua, NY (US)

(73) Assignee: Xerox Corporation, Stamford, CT (US)

( * ) Notice: Subject to any disclaimer, the term of this patent is extended or adjusted under 35 U.S.C. 154(b) by 876 days.

(21) Appl. No.: 09/660,402

(22) Filed: Sep. 12, 2000

(51) Int. Cl.[7] .......................... H04N 1/405; H04N 1/56

(52) U.S. Cl. ........................ 358/1.9; 358/3.06; 358/3.2; 358/2.1; 358/530

(58) Field of Search ......................... 358/1.9, 2.1, 3.01, 358/3.06, 3.13, 3.14, 3.2, 3.21, 3.23, 500, 501, 530, 534, 535, 536, 529; 382/162

(56) References Cited

U.S. PATENT DOCUMENTS 4,369,461 A 1/1983 Tamura
4,688,031 A 8/1987 Haggerty
5,153,576 A 10/1992 Harrington
5,321,470 A 6/1994 Hasuo et al.
5,592,310 A 1/1997 Sugiura
5,701,401 A 12/1997 Harrington et al.
5,701,405 A 12/1997 Kelley et al.
6,204,934 B1 * 3/2001 Minamino .................. 358/1.9

FOREIGN PATENT DOCUMENTS

JP A-6-59657 3/1994
JP A 11-69156 3/1999

* cited by examiner

*Primary Examiner*—Scott Rogers
(74) *Attorney, Agent, or Firm*—Oliff & Berridge, PLC

(57) ABSTRACT

Techniques for black and white pattern rendering that increase processing speed and reduce memory requirements while providing improved pattern selection performance are provided. The hue angle and lightness of a color input are determined. The hue angle is used to index into a lookup table of halftone functions that specify default frequency and spot functions for a hue angle range. For each selected halftone, the determined hue angle is substituted from the hue angle range if the determined hue angle differs from the last determined hue angle range by more than a threshold difference value. The determined lightness is used to determine the halftoning threshold value and rendering then occurs.

6 Claims, 5 Drawing Sheets

310 320 330

| | FREQUENCY | HUE ANGLE | SPOT FUNCTION |
|---|---|---|---|
| 1 | 18 | 0-72 | {add abs 2 div} |
| 2 | 18 | 73-144 | {0.5 add 2 copy dup mul 0.6 mul exch dup mul 2.4 mul add 3 1 roll dup 0 gt { dup mul 2.4 mul exch dup mul 0.6 mul add 2 copy lt {pop} {exch pop} ifelse }{ pop pop} ifelse 6 div} |
| 3 | 18 | 145-216 | {1 add dup mul 0.5 mul exch dup mul 3 mul add 5 div} |
| 4 | 18 | 217-288 | {abs 2 copy neg gt {2 mul add abs}{pop neg} ifelse 3 div} |
| 5 | 18 | 289-360 | {pop abs} |
| 6 | 16 | GRAY OBJECT | {abs exch abs sub abs} |
| 7 | 55 | IMAGE | {180 mul cos exch 180 mul cos add 2 div} |

FIG 4

LIGHTNESS THRESHOLD TABLE

| INPUT | OUTPUT |
|---|---|
| 0 | 0 |
| 1 | 11 |
| 2 | 17 |
| 3 | 21 |
| 4 | 25 |
| 5 | 28 |
| 6 | 31 |
| 7 | 34 |
| 8 | 37 |
| 9 | 39 |
| 10 | 42 |
| 11 | 44 |
| 12 | 46 |
| 13 | 48 |
| 14 | 52 |
| . | |
| . | |
| 254 | 254 |
| 255 | 255 |

FIG. 5

PATTERN RENDERING SYSTEM AND METHOD

BACKGROUND OF THE INVENTION

1. Field of Invention

This invention is directed to rendering patterns in place of colors in order to represent the colors in a black and white system.

2. Description of Related Art

Color images are increasingly used to convey information. However, support for color representation is not always provided in black and white facsimile machines, photocopy machines and other image output devices. Some conventional systems provide for black and white representation of color in which a pattern is selected to represent a color in the original color palette. A pattern representing the color is then reproduced. Since differing colors require different patterns, conventional techniques for providing this mapping of color to pattern require the calculation of many unique patterns. This requires time and/or circuitry for the necessary calculations.

Alternatively, other conventional systems have used memory structures to store the patterns as the patterns are generated. This technique reduces the time to calculate the patterns after the first color is encountered, since the calculations used to create the patterns are performed once for each color and stored in a buffer. However, such systems have difficulty in allocating sufficient memory when processing complex documents in which many colors and shades are used. For complex color documents, the storing and retrieval functions also consume processing cycles and/or increase circuitry complexity. This increases the time and/or cost necessary to create a document. Also, the amount of memory available to store all the pattern entries may be exceeded by complex color documents.

SUMMARY OF THE INVENTION

These problems limit the number of colors that can be handled and may require additional processing cycles to handle out-of-memory conditions, further increasing the time and cost necessary to create an output page. Furthermore, due to the interaction of the patterns, grayscale control is difficult and non-monotonic grayscales are occasionally generated. Non-monotonic grayscales create perceptual problems for users since the intuitive correspondence between the color and the pattern is not maintained.

This invention provides systems and methods that preserve the lightness relationship between colors in a document.

This invention provides systems and methods that reduce processing cycles and/or increase the processing speed for processing a black-white version of a color document.

This invention separately provides systems and methods that reduce the memory requirements for implementing black-white printable versions of a color document.

In various exemplary embodiments of the systems and methods according to this invention, the required memory is reduced by using the hue angle of each color to be printed as an index into a table of halftones. The indexed halftone information is then combined with the luminance, or lightness, information for the indexed color to render a color in a black/white printable version with increased processing speed and/or without having to store color pattern information.

In various exemplary embodiments, if a gray color is to be rendered, the gray scale halftone is selected to render the color appropriately without analyzing the hue angle.

BRIEF DESCRIPTION OF THE DRAWINGS

Various exemplary embodiments of this invention will be described in detail, with reference to the following figures, wherein:

FIG. 4 shows one exemplary embodiment of a halftone lookup table according to this invention;

FIG. 5 shows one exemplary embodiment of a lightness threshold table according to this invention.

DETAILED DESCRIPTION OF EXEMPLARY EMBODIMENTS

Figure 1:
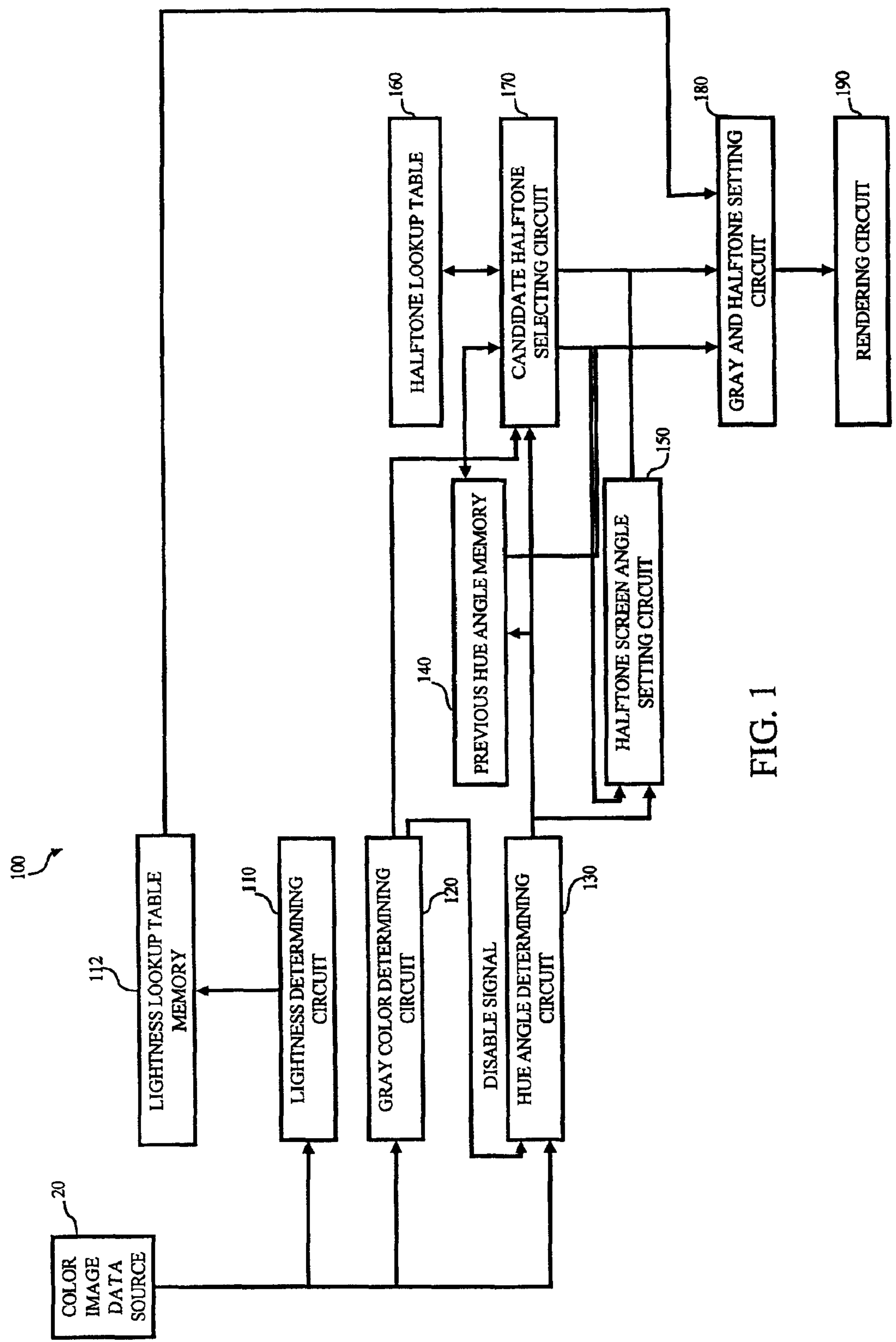
FIG. 1 is a block diagram of a first exemplary embodiment of a pattern rendering system according to this invention.

FIG. 1 shows one exemplary embodiment of a pattern rendering system 100 according to this invention. The pattern rendering system 100 includes a lightness determining circuit 110, a lightness lookup table memory 112, a gray color determining circuit 120, a hue angle determining circuit 130, a memory 140, that stores a previously used hue angle, a halftone screen angle setting circuit 150, a halftone lookup table 160, a candidate halftone selecting circuit 170, a gray and halftone setting circuit 180, and a rendering circuit 190.

The color input signal in the exemplary embodiment is received from a color image data source 20 and is applied to an input terminal of the lightness determining circuit 110. The lightness determining circuit 110 is also connected to the lightness lookup table 112. The lightness, or luminance, is determined according to any of the standard techniques for the color model in use. For example, if the color is in the RGB color space, the lightness of the color input signal is determined using the Red/Green/Blue values of the color image data received from the color image data source 20. For example, the NTSC Video Standard could be used to calculate gray values from RGB values. For color in CIE (Commission Internationale de l'Éclairage) LAB color space models, the lightness or luminance can be determined using the "L" component. Similarly, for other color space models such as XYZ, CMYK, CMY, and any other known or later developed color model, well known and established methods of determining the lightness are used.

The lightness determining circuit 110 then compensates for different device characteristics by looking up the input signal lightness in the lightness lookup table memory 112 to determine an output lightness in accordance with the lookup table.

The output of the lightness determining circuit 110 and the lightness lookup table 112 is a grayscale output signal. The grayscale output signal is then applied as an input to the gray and halftone setting circuit 180.

In parallel with the lightness determining circuit 110, the gray color determining circuit 120 determines whether the color of a current portion of the image data is gray. If the color is already gray, as determined by the gray color determining circuit 120, then color or pattern mapping according to this invention is not required. As a result, when gray is detected, the gray color determining circuit 120 asserts a disable signal which disables the hue angle determining circuit 130. The gray color output signal output by the gray color determining circuit 120 is then supplied to the candidate halftone selecting circuit 170, which selects the appropriate halftone. Since the halftone used to render gray image data is associated with a single fixed halftone screen angle, no hue angle processing is required. The output of the candidate halftone selecting circuit 170 is then supplied to the gray and halftone setting circuit 180 where the candidate halftone is combined with the lightness information received from lightness lookup table 112. The gray and halftone setting circuit then sets a halftone based on the candidate halftone and the lightness signal. The set halftone is then supplied to the rendering circuit 190. The image data is rendered by the output device, which can include, but is not limited to, a facsimile machine, a black/white copier or any other system in which black and white representation of color image data is desired, based on the halftone set by the gray and halftone setting circuit.

If the color of a current portion of the color image data received from the color image data source 20 is not gray, then the failure of the gray determining circuit 120 to detect gray enables the hue angle determining circuit 130 to process the color image data supplied to the hue angle determining circuit 130. The hue angle determining circuit 130 determines the hue angle of the current portion of the color image data. The hue angle of a color is determined by well known and established methods appropriate to the color model chosen. The value of the hue angle determining circuit 130 is then supplied as an input to the candidate halftone selecting circuit 170.

The determined hue angle is also supplied to the halftone screen angle setting circuit 150. The previous hue angle used by the candidate halftone selecting circuit 170 is also stored in the previous hue angle memory 140. If the determined hue angle differs from the previous hue angle stored in the previous hue angle memory 140 by less than a threshold value, then the previous halftone, as determined by the previous hue angle stored in the previous hue angle memory 140 is used to generate the pattern for the current portion of the color image data. In the exemplary embodiment, the threshold value is about 1°. If the difference between the determined hue angle and the previous hue angle stored in the previous hue angle memory 140 is equal to or above the threshold value, then the determined hue angle is used to select a halftone from the halftone lookup table 160 based on the presence of the determined hue angle in a hue angle range associated with a halftone entry in the halftone lookup table 160. If the difference is above the threshold value, the previous hue angle stored in the previous hue angle memory 140 is updated with the newly determined hue angle.

The candidate halftone selecting circuit 170 uses the value of the hue angle determined by the hue angle determining circuit 130 or stored in the previous hue angle memory 140, as an index into the table of halftones contained in the halftone lookup table 160. The selected halftone specifies the spot function and frequency that are output by the candidate halftone selecting circuit 170 to the gray and halftone setting circuit 180, while the hue angle determined by the hue angle determining circuit 130 or stored in the previous hue angle memory 140, specifies the halftone screen angle that will be output for use in the halftone.

The gray and halftone setting circuit 180, combines the halftone output by the candidate halftone selecting circuit 170 and the halftone screen angle set from the determined hue angle to form a resultant halftone. The resultant halftone is then supplied to the rendering circuit 190. The rendering circuit 190 renders the image data for the output device based on the resultant halftone.

Figure 2:
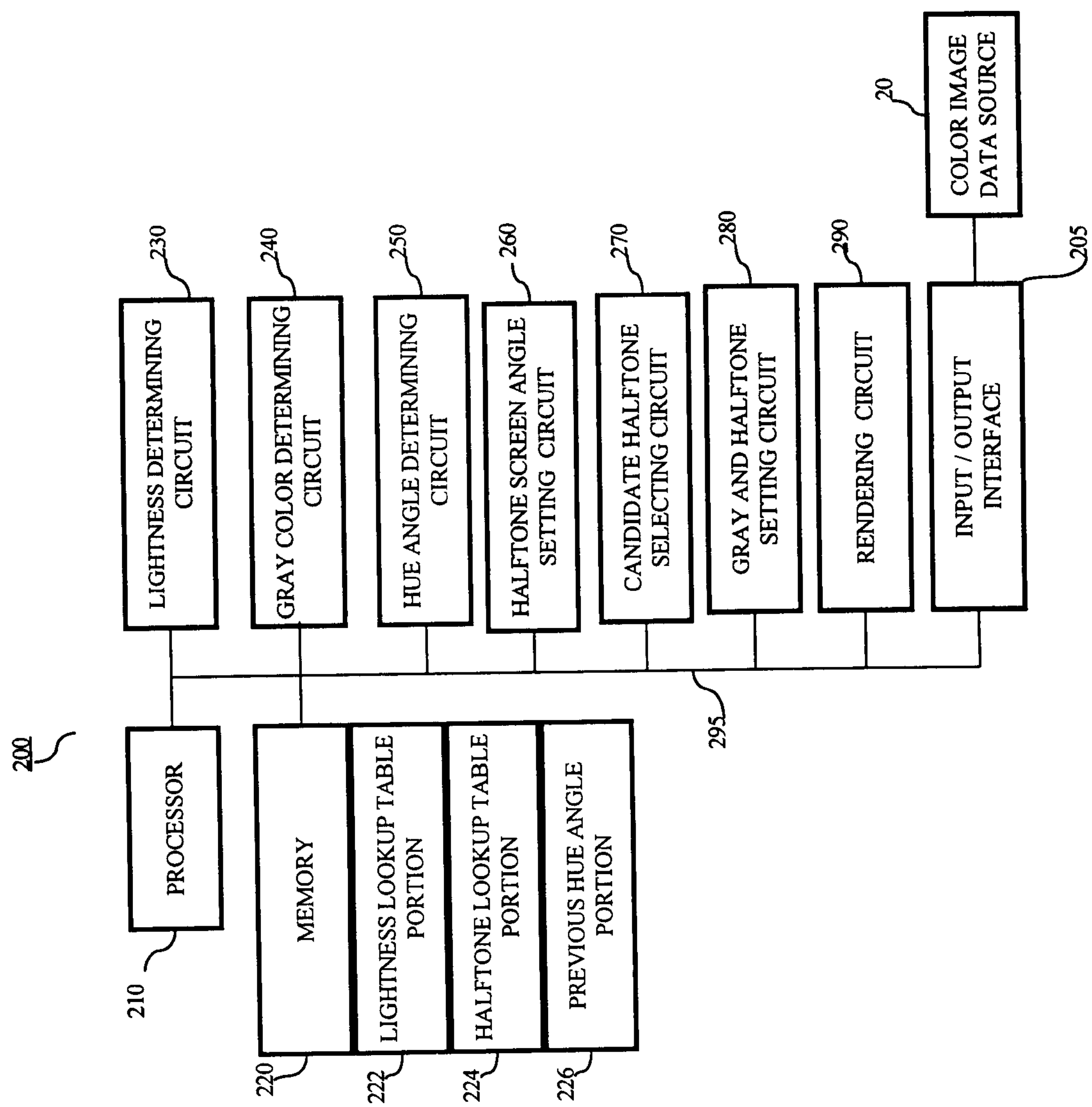
FIG. 2 is a block diagram of a second exemplary embodiment of a pattern rendering system according to this invention.

FIG. 2 shows a second exemplary embodiment of a pattern rendering system 200 according to this invention. The pattern rendering system 200 includes a processor 210, connected via a communications bus 295 to a memory 220, a lightness determining circuit 230, a gray determining circuit 240, a hue angle determining circuit 250, a halftone screen angle setting circuit 260, a candidate halftone selecting circuit 270, a gray and halftone setting circuit 280, a rendering circuit 290 and input/output interface circuit 205. The memory includes a lightness lookup table 222, a halftone lookup table 224 and a previous hue angle memory portion 226.

The color image data source 20 is connected to the input/output interface 205 and supplies color image data. Under the control of the processor 210, the color image data is then supplied to the lightness determining circuit 230. The lightness determining circuit 230 determines the lightness, or luminance, of each portion of the color image data supplied using any of the standard techniques for the color model in use, as discussed above.

Under the control of the processor 210, the lightness determining circuit 230 then compensates for different device characteristics by looking up the lightness in the lightness lookup table 222 of the memory 220 to determine an output lightness in accordance with the lookup table.

The output of the lightness determining circuit 230 and the lightness lookup table 222 is a grayscale output signal. The grayscale output signal is then supplied to the gray and halftone setting circuit 280.

In parallel with the lightness determining circuit 230, the gray color determining circuit 240 determines, under control of the processor 210, whether the color of a current portion of the color image data is gray. If the color of the current portion of the color image data is gray, as determined by the gray color determining circuit 240, the gray color output signal output by the gray color determining circuit 240 is supplied to the candidate halftone selecting circuit 270. In response, the candidate halftone selecting circuit 270 selects, under control of the processor 210, the gray halftone. This gray color output signal information is then supplied to the gray and halftone selecting circuit 280, the gray and halftone setting circuit sets, under the control of the processor 210, the halftone to be used in rendering gray based on the value of the lightness received from the lightness lookup table 222. The gray halftone signal is then supplied to the rendering circuit 290. In response, the rendering circuit 290 renders, under control of the processor 210, the image data based on the gray halftone signal for the output device, which can include, but is not limited to, a facsimile machine, a black/white copier or any other system in which a pattern representation of color image data is required, as discussed above.

If the color of the current portion of the color image data received from the color image data source 20 is not gray, as determined by the gray color determining circuit 240, the current portion is supplied to the hue angle determining circuit 250. The hue angle determining circuit 250 determines, under control of the processor 210, the hue angle of the current portion of the color image data. As discussed above, the hue angle of a color is determined by well known and established methods appropriate to the color model chosen. The value of the hue angle determining circuit 250 is then supplied as an input to the candidate halftone selecting circuit 270.

The candidate halftone selecting circuit 270 then uses, under control of the processor 210, the value of the hue angle determined by the hue angle determining circuit 250 as an index into the table of halftones contained in the halftone lookup table 224. The determined hue angle is also supplied to the halftone screen angle setting circuit 260. The previous hue angle used by the candidate halftone selecting circuit 270 is also stored in the previous hue angle memory portion 226. If the determined hue angle differs from the previous hue angle stored in the previous hue angle memory portion 226 by less than a threshold value, then the previous halftone, as determined by the previous hue angle stored in the previous hue angle memory 226 is used to generate the pattern for the current portion of the color image data. In the exemplary embodiment, the threshold value is about 1°.

In contrast, if the difference between the determined hue angle and the previous hue angle stored in the previous hue angle memory portion 226 is equal to or above the threshold value, then the determined hue angle is used to select a halftone go from the halftone lookup table 224 based on the presence of the determined hue angle in a given hue angle range. The previous hue angle stored in the previous hue angle memory portion 226 is updated to store the newly determined hue angle.

The halftone selected by the candidate halftone selecting circuit specifies the spot function and frequency that are output by the candidate halftone selecting circuit 270, under control of the processor 210, to the gray and halftone setting circuit 280, while the hue angle determining circuit 250 specifies the halftone screen angle that will be output for use in the halftone.

The gray and halftone setting circuit 280 combines, under control of the processor 210, the halftone output by the candidate halftone selecting circuit 270 and the determined hue angle output by the hue angle determining circuit 250 to form a resultant halftone. The resultant halftone is supplied by the gray and halftone setting circuit 280, under control of the processor 210, to the rendering circuit 190. The rendering circuit 290, under control of the processor 210, renders the image data for the output device.

Figure 3:
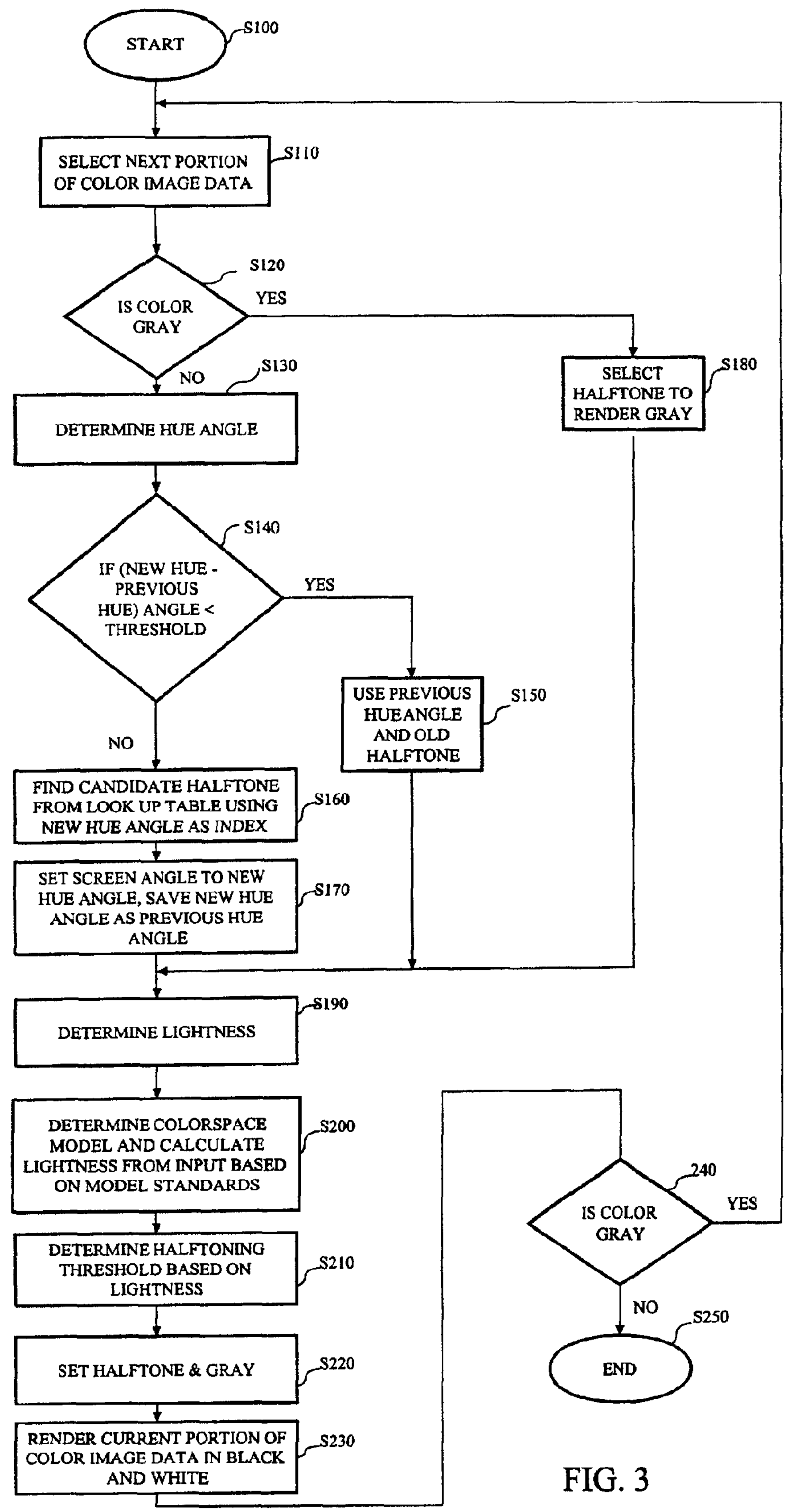
FIG. 3 is a flowchart outlining one exemplary embodiment of a pattern rendering method according to this invention.

FIG. 3 is a flowchart outlining one exemplary embodiment of a method for rendering color image data using black and white patterns according to this invention. Beginning in step S100, control continues to step SI 10, where a next portion of the color image data is selected. Then in step S120, a determination is made whether the color image data signal already reflects a gray color. If the color image data already reflects a gray color, control jumps to step S180. Since the halftone to render gray image data is associated with a single fixed halftone screen angle, no hue angle processing is required. The halftone to render gray is selected and control jumps to step S190. Otherwise, if the color image data does not reflect a gray color, control jumps to step S130.

In step S130, the hue angle for the color image data is determined. The color input hue angle can be determined by any well known method of determining hue angle for the color space model as discussed above. Next, in step S140, a determination is made whether the difference between the newly determined hue angle and a previously determined hue angle is below a threshold value. If the difference between the newly determined hue angle and the previously determined hue angle is below a threshold value, control continues to step S150. Otherwise control jumps to step S160.

In step S150, the screen angle and the halftone are not changed and the previously determined hue angle and the previous halftone are used to render the color image data. Additionally, the previously determined hue angle is not updated. Control then jumps to step S190.

In contrast, in step S160, a candidate halftone is selected from the halftone lookup table by using the newly determined hue angle as an index into the halftone lookup table. A selected halftone is identified from the halftone lookup table by identifying the range of hue angles in the table within which the newly determined hue angle lies. Then, in step S170, the halftone screen angle associated with the current halftone is determined based on the newly determined hue angle. The newly determined hue angle is then stored as the previously determined hue angle. Control then jumps to step S190. This prevents a change of patterns for colors that are very close in terms of color or shade.

In step S190, the lightness of the color signal is determined. For convenience of discussion, the lightness is shown in the exemplary embodiment as determined after the hue angle has been determined. However, the lightness can be determined whenever the current portion of the color image data is available. Thus, the lightness can be determined, in parallel with, preceding or following determining the hue angle. Then, in step S200, the color model being used is determined and a lightness determination is made using standard, well known techniques for determining lightness for the determined color model. For example, if the color image data is in the RGB color space, coefficients of, for example, 0.1B, 0.6G, 0.3R can be used according to the NTSC standard for determining lightness in RGB to black and white conversion. However, any method of lightness determination supported by the color model can be used. For example, in the CIE LAB color space models, the lightness may be calculated based on the L* component.

Next, in step S210, the halftoning threshold is determined based on the determined lightness values determined in step S200. The halftoning threshold value determines how many pixels are turned on to represent a given density of color. Thus, the lightness of the color provides the halftoning threshold value. Control then continues to step S220.

In step S220, the previously determined halftoning and gray threshold values are set. Next, in step S230, the image data is rendered using the determined halftone, and determined halftoning thresholds. Then, in step S240, a determination is made whether any color image data remains to be processed. If any color image data remains to be processed, control jumps back to step S110. Otherwise control continues to step S250, where processing ends.

FIG. 4 shows an exemplary embodiment of a halftone lookup table with 7 halftones. In the exemplary embodiment of the halftone lookup table shown in FIG. 4, each of the halftones 1–7 are associated with a specific spatial frequency 310, a range of hue angles 320 and a given spot function 330. The 360° of possible hue angle are divided into ranges. For example, hue angle 1 is associated with a frequency of 18, a hue angle of 0°–72°, and the spot function {add abs 2 div}. The exemplary spot function is written in a PostScript® type Page Description Language. However, it should be apparent that any method of implementing a halftone specification using any known or later developed method or language may be used.

If a determined hue angle of 35 were processed with the exemplary embodiment of the halftone lookup table, the hue angle would lie between 0° and 72°. Therefore, the halftone associated with this range, having a frequency of 18 and a spot function of {add abs 2 div} would be selected for use with the determined hue angle of 35.

The exemplary embodiment of the halftone lookup table shown in FIG. 4, shows hue angle ranges divided evenly across the possible 360° of possible hue angle. However, the hue angles ranges do not need to evenly divide the 360° of hue angle color space. Any division may be adopted.

The halftone associated with a gray object having a frequency of sixteen and spot function {180 mul cos exch 180 mul cos add 2 div} is selected when the pattern rendering systems 100 and 200 determine that gray color is to be output. Similarly, if the current portion of the color image data is high spatial frequency image data, such that no single color can be associated with the current portion, an image is detected. In response, halftone 7 is selected to optimize the pattern rendering image data.

FIG. 5 shows one exemplary embodiment of a data structure for the lightness lookup tables 112 and/or 222 according to this invention. The lightness lookup tables 112 and/or 222 accept a lightness value as an input and provide a transformed lightness value as an output. This transformation allows the lightness lookup tables 112 and/or 222 to be used to correct an output device for anomalies.

The pattern rendering systems 100 and/or 200 can be implemented using discrete logical devices and memory devices. However, the pattern rendering systems 100 and/or 200 can also be implemented on a general purpose computer, a special purpose computer, an ASIC or other integrated circuit, a digital signal processor, a hardwired electronic or logic circuit such as a discrete element circuit, programmable logic devices, such as PLD, PLA, FPGA or PAL, or the like. In general, any device, capable of implementing a finite state machine that is in turn capable of implementing the flowchart of FIG. 3 can be used to implement the black and white pattern rendering systems 100 and/or 200.

As described above, the lightness lookup tables 112 and/or 222 and the halftone lookup tables 160 and/or 224 can be implemented in read only memory. However, the lightness lookup tables 112 and/or 222 and the halftone lookup tables 160 and/or 224 and the previous hue angle memories 140 and/or 226 can also be implemented using random access memory, flash memory, a floppy disk and disk drive, a writeable optical disk and disk drive, a hard drive or the like.

The pattern rendering systems 100 and/or 200 can each be implemented as software executing on a programmable general purpose computer, a special purpose computer, a microprocessor or the like. The pattern rendering systems 100 and/or 200 can each also be implemented as a routine embedded in a printer driver, as a resource residing on the server, or the like. The pattern rendering systems 100 and/or 200 can each also be implemented by physically incorporating it into a software or hardware system, such as the hardware and software systems of a printer.

While is invention has been described in conjunction with the exemplary embodiments outlined above, it is evident that many alternatives, modifications and variations will be apparent to those skilled in the art. Accordingly, the exemplary embodiments of the inventions as set forth above, are intended to be illustrative, not limiting. Accordingly, various changes may be made without departing from the spirit and scope of the invention.

What is claimed is:

1. A pattern rendering system that converts a portion of color image data into monochrome image data, comprising:

a lightness determining circuit that determines a lightness of the portion of color image data;

a gray determining circuit that determines if the portion of the color image data is already gray;

a hue angle determining circuit that determines the hue angle of the portion of color image data; and a gray and halftone setting circuit connected to the lightness determining circuit and the gray determining circuit to select a halftone based on the hue angle of the color image data and that sets a halftone screen angle based on the determined hue angle of the color image data.

2. The pattern rendering system of claim 1, further comprising:

a determined hue angle memory that stores a saved hue angle; and a threshold determining circuit wherein;

if a subsequent hue angle differs from the saved hue angle by more than the determined threshold amount, the subsequent hue angle is used to select the halftone and the subsequent hue angle is stored as the saved hue angle, and if the subsequent hue angle differs from the saved hue angle by less than the threshold amount, the saved hue angle is used to select the halftone.

3. The pattern rendering system of claim 1, wherein the gray and halftone setting circuit selects a fixed gray color and halftone to render when the image data signal is identified as gray.

4. A method for converting a portion of color image data into monochrome image data, by associating hue angle ranges with halftones in a halftone table containing default spot functions and spatial frequencies comprising:

determining a lightness of the portion of color image data signal;

determining a gray color of the portion of color image data signal;

determining a hue angle of the portion of color image data signal; and determining a gray color and a halftone to set based on the determined lightness, the determined hue angle and the determined gray color of the input signal, the determined hue angle providing an index into a table of halftones that has a range of hue angles associated with discrete halftones, by selecting the halftone associated with a range of hue angles within which the determined hue angle is found.

5. The method of claim 4, further comprising selecting a fixed gray color and halftone to render when the color image data signal is identified as gray.

6. The method of claim 4, further comprising:

saving a first hue angle as a saved hue angle;

comparing a subsequent hue angle to the saved hue angle;

if the subsequent hue angle differs from the saved hue angle by at least a threshold amount, using the subsequent hue angle to select a halftone from a table of halftones, storing the subsequent hue angle as the saved hue angle, and using the subsequent hue angle as a halftone screen hue angle; and if the subsequent hue angle differs by less than the threshold, using the saved hue angle to select the halftone from a table of halftones and using the saved hue angle as the halftone screen angle.

* * * * *